United States Patent
Gulati et al.

(10) Patent No.: US 10,856,345 B2
(45) Date of Patent: Dec. 1, 2020

(54) METHODS AND APPARATUS FOR DEVICE-TO-DEVICE FEEDBACK

(71) Applicant: QUALCOMM Incorporated, San Diego, CA (US)

(72) Inventors: Kapil Gulati, Dover, DE (US); Shailesh Patil, San Diego, CA (US); Tien Viet Nguyen, Bridgewater, NJ (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 18 days.

(21) Appl. No.: 16/156,646

(22) Filed: Oct. 10, 2018

(65) Prior Publication Data

US 2019/0110325 A1 Apr. 11, 2019

Related U.S. Application Data

(60) Provisional application No. 62/571,037, filed on Oct. 11, 2017.

(51) Int. Cl.
*H04W 76/14* (2018.01)
*H04W 72/04* (2009.01)
(Continued)

(52) U.S. Cl.
CPC ........... *H04W 76/14* (2018.02); *H04L 1/1854* (2013.01); *H04L 1/1861* (2013.01);
(Continued)

(58) Field of Classification Search
CPC ............. H04W 76/14; H04W 72/0446; H04W 72/0453; H04L 1/1854; H04L 1/1861;
(Continued)

(56) References Cited

U.S. PATENT DOCUMENTS

2017/0347394 A1* 11/2017 Yasukawa ............. H04W 28/04

FOREIGN PATENT DOCUMENTS

| EP | 2688226 A2 | 1/2014 |
| WO | 2016076301 A1 | 5/2016 |

OTHER PUBLICATIONS

R1-132188, 'D2D Communication in LTE', Interdigital, 3GPP TSG-RAN WG1 Meeting #73 Fukuoka, Japan, May 20-24, 2013, pp. 1-7. (Year: 2013).*

(Continued)

*Primary Examiner* — Melvin C Marcelo

(57) ABSTRACT

Wireless communication apparatus and methods related to wireless communication, for example, device-to-device feedback are described. In aspects, a method of wireless communication may include communicating a sidelink traffic communication using a sidelink communication structure, and communicating an allotting for sidelink feedback using at least one feedback symbol of the sidelink communication structure. In aspects, the method includes communicating, by a first wireless communication device, a sidelink feedback communication using at least one feedback symbol of the sidelink communication structure, wherein the sidelink feedback communication is associated with the sidelink traffic communication. Numerous other aspects are provided.

29 Claims, 12 Drawing Sheets

(51) Int. Cl.
*H04L 5/00* (2006.01)
*H04L 1/18* (2006.01)
(52) U.S. Cl.
CPC .......... *H04L 1/1864* (2013.01); *H04L 5/0032* (2013.01); *H04L 5/0053* (2013.01); *H04L 5/0082* (2013.01); *H04L 5/0091* (2013.01); *H04W 72/0446* (2013.01); *H04W 72/0453* (2013.01); *H04L 5/001* (2013.01); *H04L 5/0023* (2013.01)
(58) Field of Classification Search
CPC ... H04L 1/1864; H04L 5/0032; H04L 5/0053; H04L 5/0082; H04L 5/0091; H04L 5/001; H04L 5/0023
See application file for complete search history.

(56) References Cited

OTHER PUBLICATIONS

International Search Report and Written Opinion—PCT/US2018/055467—ISA/EPO—dated Jan. 28, 2019.

\* cited by examiner

METHODS AND APPARATUS FOR DEVICE-TO-DEVICE FEEDBACK

CLAIM OF PRIORITY

This application claims the benefit of U.S. Provisional Application Ser. No. 62/571,037 filed Oct. 11, 2017, which is assigned to the assignee hereof and hereby expressly incorporated by reference.

FIELD OF THE DISCLOSURE

This application relates to wireless communication systems, and more particularly to methods and apparatus for device-to-device feedback.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. One area of interest for further development in 5G NR and other communication standards (e.g., LTE) is device-to-device (D2D) communications, which may include vehicle-to-everything (V2X) and vehicle-to-vehicle (V2V) communications. In D2D, devices may communicate directly with each other via sidelink communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

For example, in an aspect of the disclosure, a method of wireless communication includes communicating a sidelink traffic communication using a sidelink communication structure, and communicating an allotting for sidelink feedback using at least one feedback symbol of the sidelink communication structure. In aspects, the method includes communicating, by a first wireless communication device, a sidelink feedback communication using at least one feedback symbol of the sidelink communication structure, wherein the sidelink feedback communication is associated with the sidelink traffic communication.

In an additional aspect of the disclosure, a wireless communication device for wireless communication includes a memory and at least one processor coupled to the memory, the at least one processor configured to communicate a sidelink traffic communication using a sidelink communication structure, and communicate an allotting for sidelink feedback using at least one feedback symbol of the sidelink communication structure. In aspects, the at least one processor is further configured to communicate a sidelink feedback communication using at least one feedback symbol of the sidelink communication structure, wherein the sidelink feedback communication is associated with the sidelink traffic communication.

In an additional aspect of the disclosure, a non-transitory computer-readable medium stores one or more instructions for wireless communication by a wireless communication device, the one or more instructions, when executed by one or more processors of a user equipment, causing the one or more processors to communicate a sidelink traffic communication using a sidelink communication structure, and communicate an allotting for sidelink feedback using at least one feedback symbol of the sidelink communication structure. In aspects, the one or more instructions, when executed by one or more processors of a user equipment, further cause the one or more processors to communicate, by a first wireless communication device, a sidelink feedback communication using at least one feedback symbol of the sidelink communication structure, wherein the sidelink feedback communication is associated with the sidelink traffic communication.

In an additional aspect of the disclosure, an apparatus for wireless communication includes means for communicating a sidelink traffic communication using a sidelink communication structure, and means for communicating an allotting for sidelink feedback using at least one feedback symbol of the sidelink communication structure. In aspects, the apparatus further includes means for communicating, by a first wireless communication device, a sidelink feedback communication using at least one feedback symbol of the sidelink communication structure, wherein the sidelink feedback communication is associated with the sidelink traffic communication.

Other aspects, features, and embodiments of the present disclosure will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
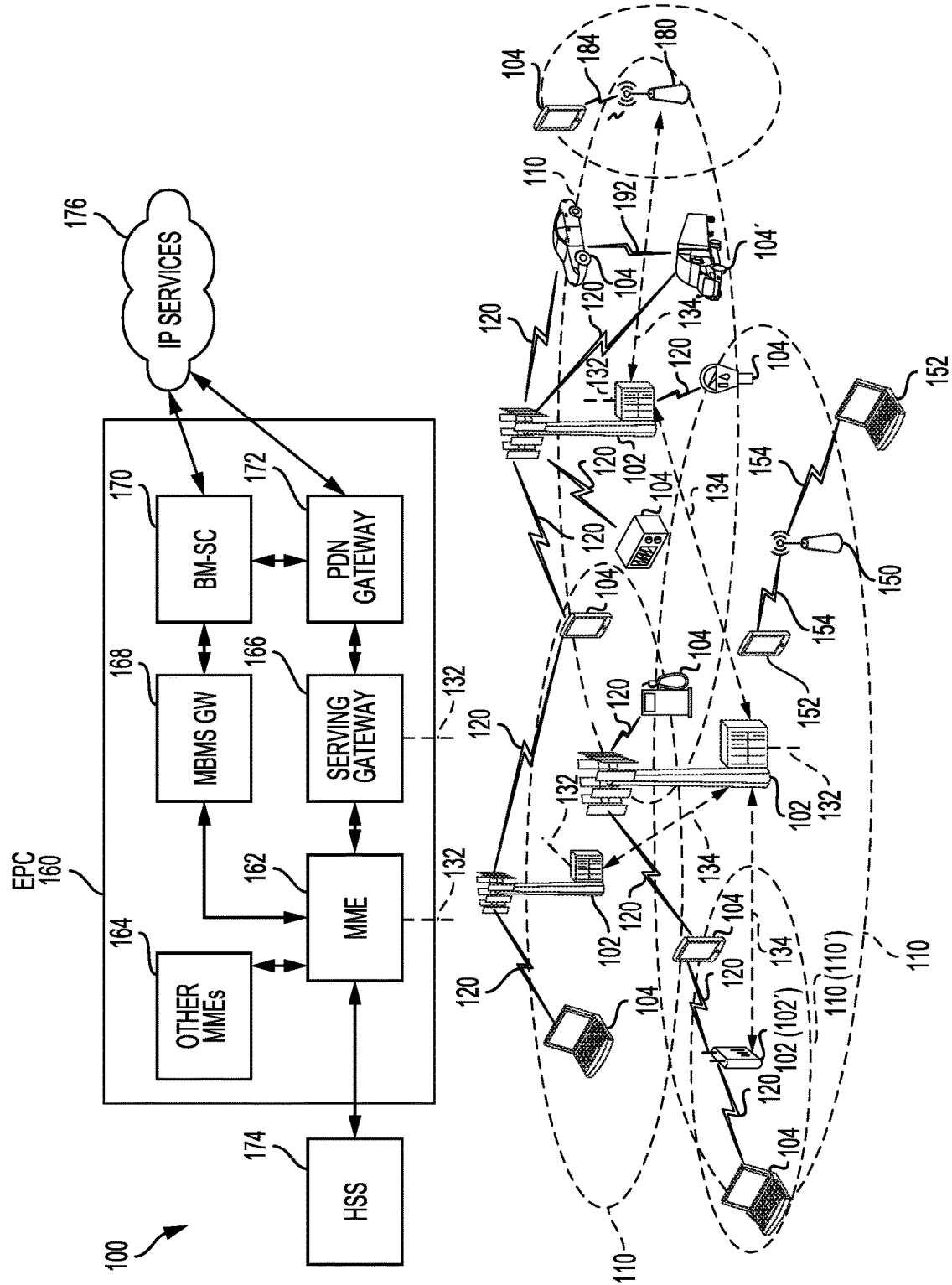
FIG. 1 is a diagram illustrating an example of a wireless communication system and an access network in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communication system and an access network 100 in accordance with various aspects of the present disclosure. The wireless communication system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth, for example, per carrier allocated in a carrier aggregation of up to a total of Yx MHz (x component carriers), used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In aspects, the wireless communication system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to perform a sidelink communication (e.g., using a carrier 192 like a sidelink carrier) with a second UE 104' for a device-to-device (D2D) communication. In aspects, the D2D communication may include a vehicle-to-everything (V2X) communication or a vehicle-to-vehicle (V2V) communication. The UE 104 may communicate with a second UE 104' via the carrier 192 using one or more sidelink communication structures having at least one feedback symbol. In an aspect, at least a portion of a plurality of frequency bands for the carrier 192 corresponds to an Intelligent Transport System frequency spectrum for a sidelink carrier. In aspects, the D2D communication may include D2D feedback (e.g., D2D sidelink feedback) communication as described herein.

Figure 2A:
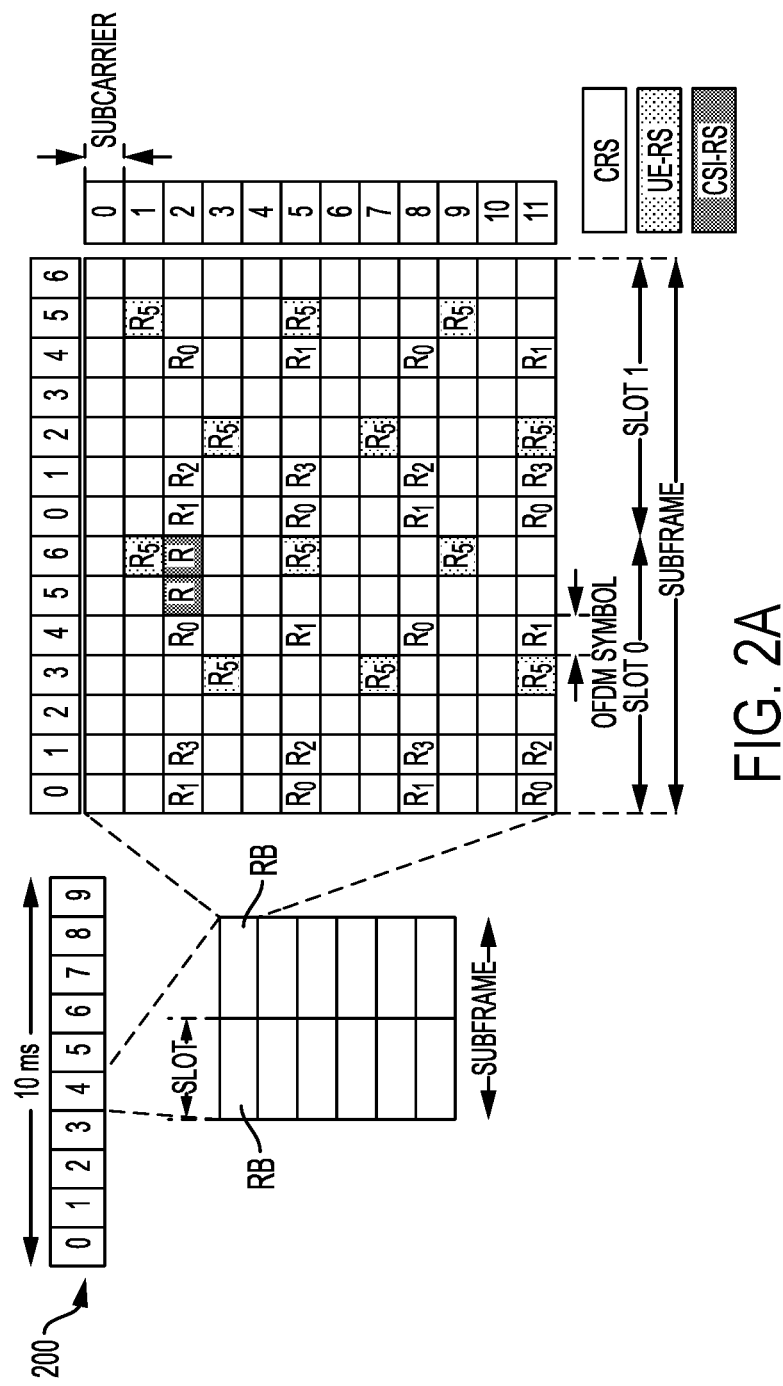
FIGS. 2A, 2B, 2C, and 2D are diagrams illustrating examples of a DL frame structure, DL channels within the DL frame structure, an UL frame structure, and UL channels within the UL frame structure, respectively.
Figure 2B:
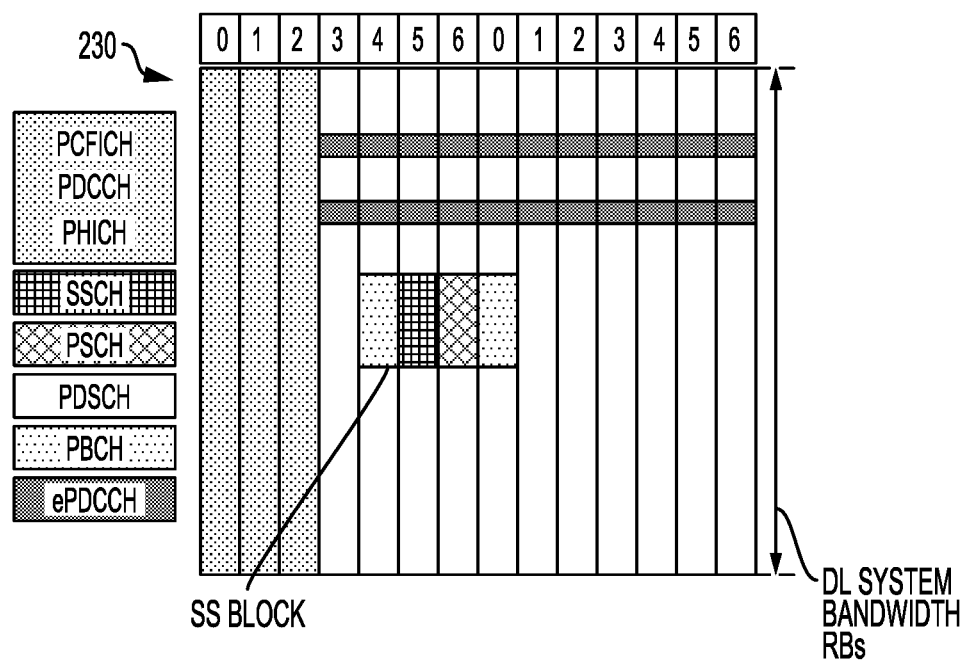
Figure 2C:
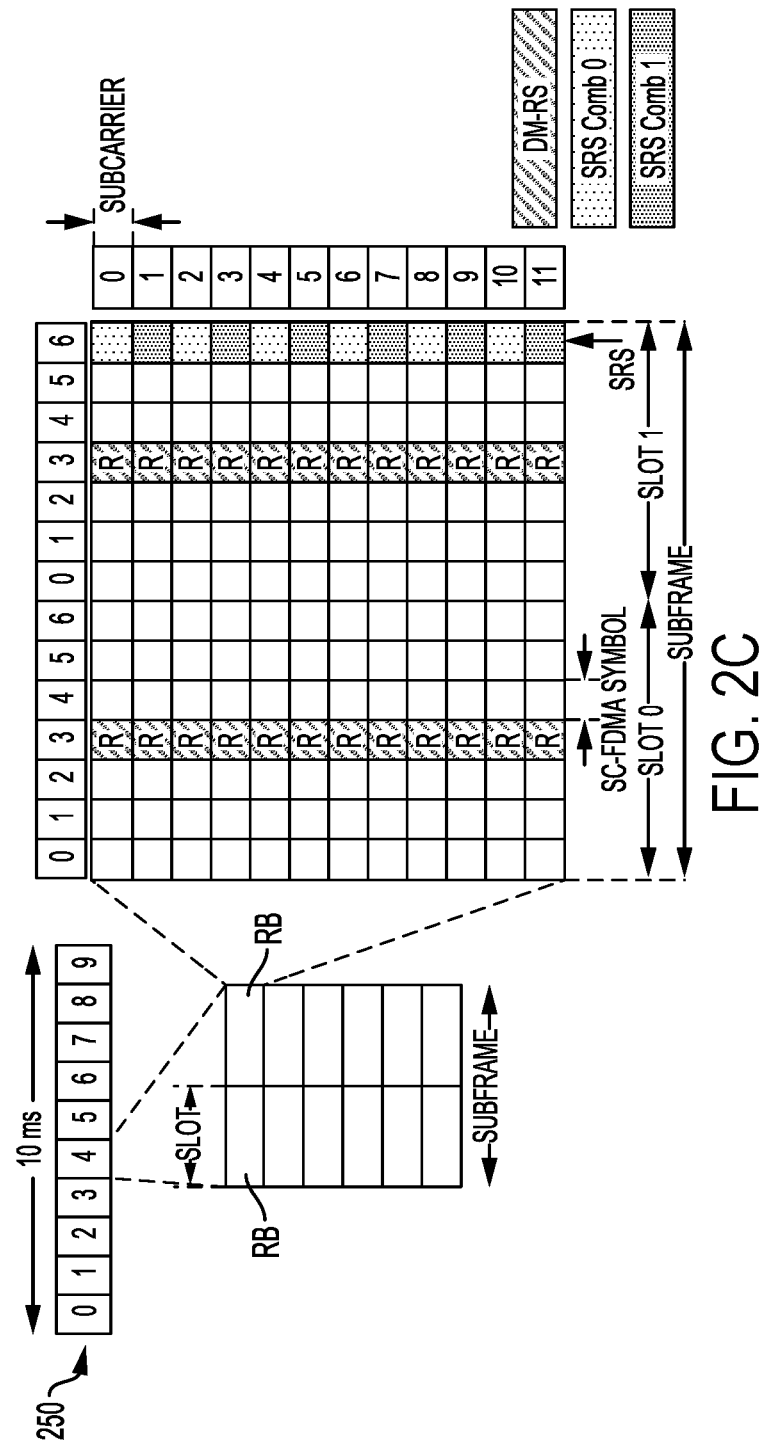
Figure 2D:
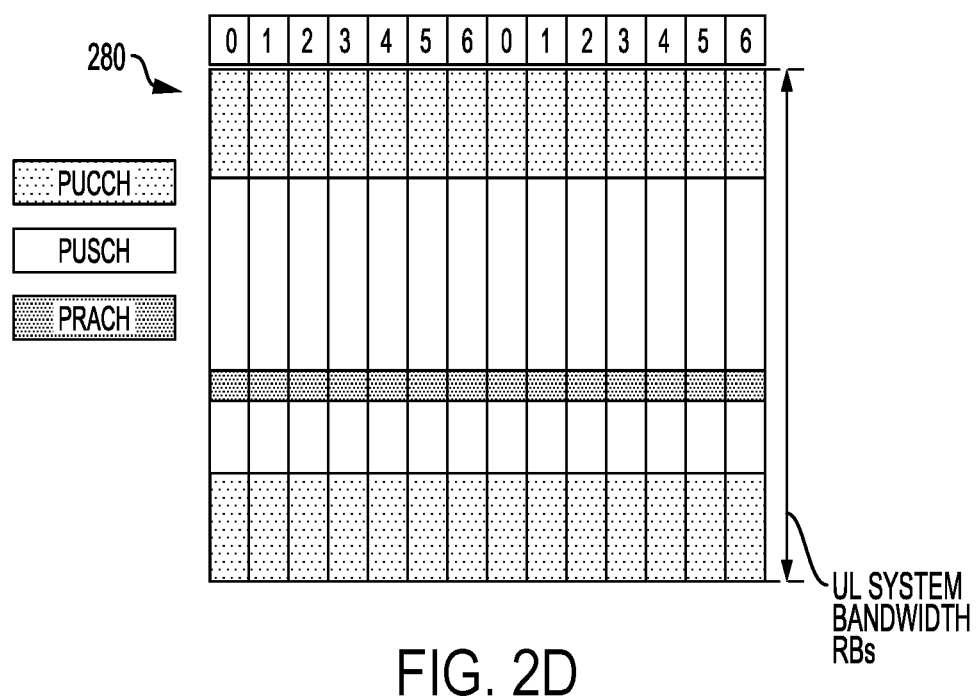

FIG. 2A is a diagram 200 illustrating an example frame structure of one or more downlink (DL) frames in accordance with various aspects of the present disclosure. FIG. 2B is a diagram 230 illustrating an example of channels within the frame structure of a DL frame in accordance with various aspects of the present disclosure. FIG. 2C is a diagram 250 illustrating an example frame structure of one or more uplink (UL) frames in accordance with various aspects of the present disclosure. FIG. 2D is a diagram 280 illustrating an example of channels within the frame structure of a UL frame in accordance with various aspects of the present disclosure. Other wireless communication technologies may have a different frame structure and/or different channels. A frame (e.g., a 10 ms frame) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB contains 12 consecutive subcarriers (e.g., for 15 kHz subcarrier spacing) in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (e.g., also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
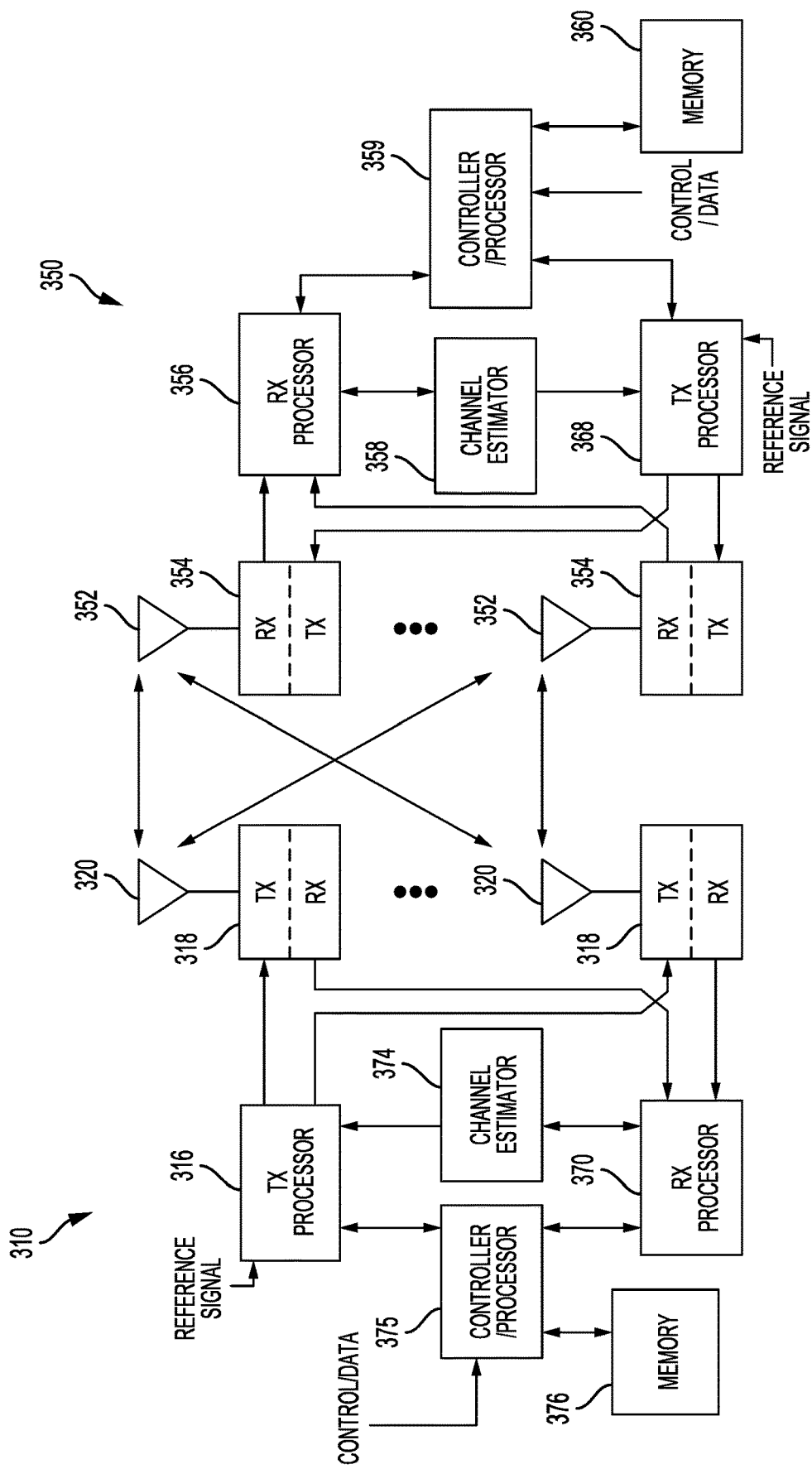
FIG. 3 is a diagram illustrating an example of a base station and user equipment (UE) in an access network in accordance with various aspects of the present disclosure.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

One or more components of UE 350 may be configured to perform methods of D2D feedback, as described in more detail elsewhere herein. For example, the controller/processor 359 and/or other processors and modules of UE 350 may perform or direct operations of, for example, process 800 of FIG. 8 and/or other processes as described herein. In some aspects, one or more of the components shown in FIG. 3 may be employed to perform example process 800 of FIG. 8 and/or other processes as described herein.

In some aspects, UE 350 may include means for means for communicating a sidelink traffic communication using a sidelink communication structure, and means for communicating an allotting for sidelink feedback using at least one feedback symbol of the sidelink communication structure. In some aspects, UE 350 may include means for communicating a sidelink feedback communication using at least one feedback symbol of the sidelink communication structure, wherein the sidelink feedback communication is associated with the sidelink traffic communication. In some aspects, such means may include one or more components of UE 350 described in connection with FIG. 3.

Figure 4:
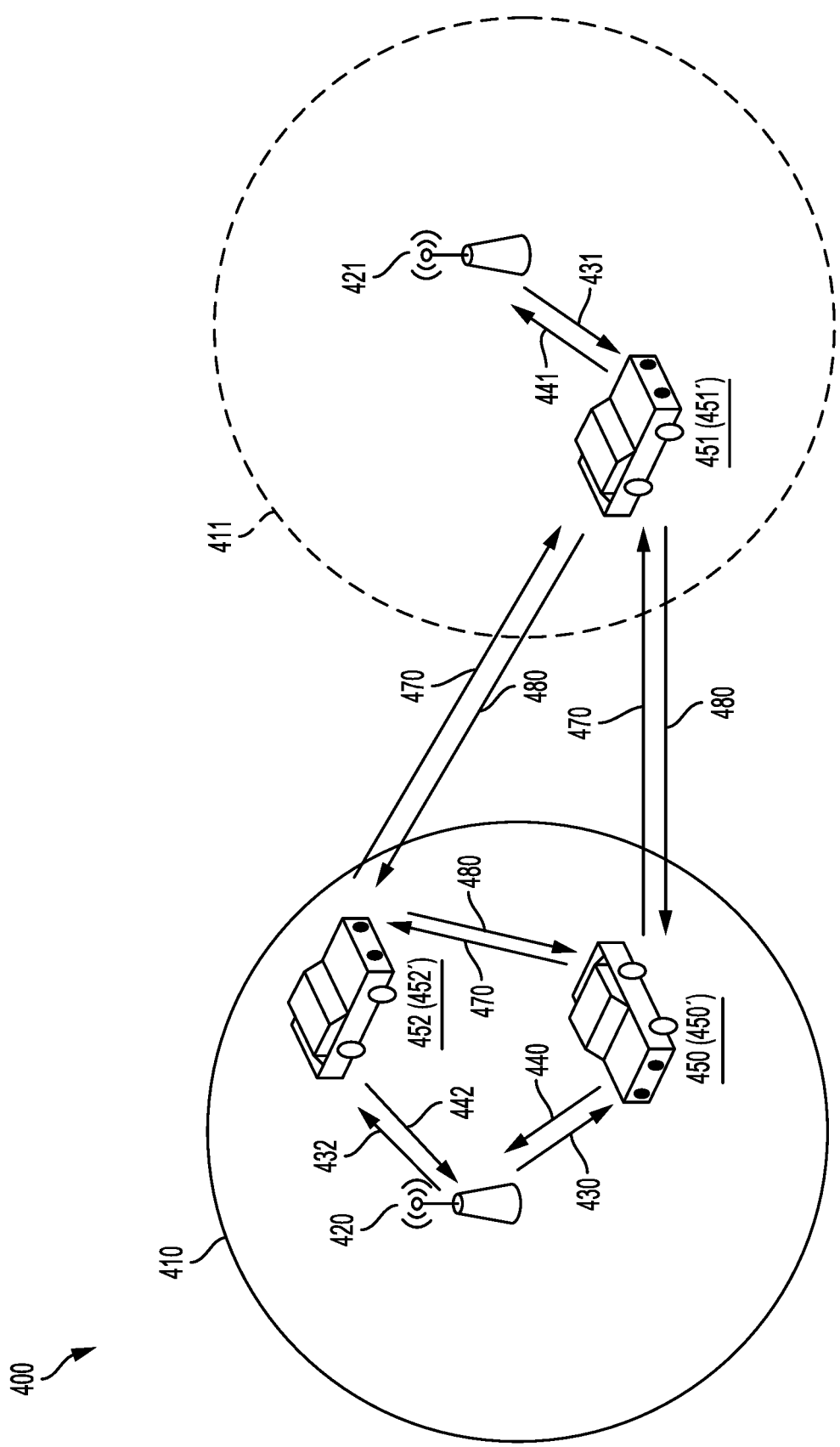
FIG. 4 is a diagram of a wireless communication system in accordance with various aspects of the present disclosure.

FIG. 4 is a diagram of a D2D communication system 400 which, for example, may include V2X communication system and/or V2V communication system. For example, the D2D communication system 400 may include a first vehicle 450' that communicates with a second vehicle 451'. In some aspects, the first vehicle 450' and/or the second vehicle 451' may be configured to communicate in a specific spectrum, such as an intelligent transport systems (ITS) spectrum. The ITS spectrum may be unlicensed, and therefore a plurality of different technologies may use the ITS spectrum for communication, including LTE, LTE-Advanced, Licensed Assisted Access (LAA), Dedicated Short Range Communications (DSRC), 5G, new radio (NR), 4G, and the like. The foregoing list of technologies is to be regarded as illustrative, and is not meant to be exhaustive.

The D2D communication system 400 may utilize LTE technology or another technology (e.g., 5G NR). For example, a vehicle in D2D communication may incorporate therein a UE of the LTE or 5G NR technology. In D2D communication (e.g., V2X communication or V2V communication), the vehicles 450', 451' may be on networks of different mobile network operators (MNOs). Each of the networks may operate in its own frequency spectrum. For example, the air interface to a first vehicle 450' (e.g., the Uu interface) may be on one or more frequency bands different from the air interface of the second vehicle 451'. The first vehicle 450' and the second vehicle 451' may communicate via a sidelink (e.g., using a carrier 192 like a sidelink carrier), for example, via a PC5 interface. In some examples, the MNOs may schedule sidelink communication between or among the vehicles 450', 451' in V2X spectrum (e.g., V2V spectrum). An example of the V2X spectrum may include the intelligent transport system (ITS) frequency spectrum. The ITS spectrum may be unlicensed, and therefore a plurality of different technologies may use the ITS spectrum for communication, including LTE, LTE-Advanced, Licensed Assisted Access (LAA), Dedicated Short Range Communications (DSRC), 5G, new radio (NR), 4G, and the like. The foregoing list of technologies is to be regarded as illustrative, and is not meant to be exhaustive. However, in some aspects, a D2D communication (e.g., a sidelink communication) between or among vehicles 450', 451' is not scheduled by MNOs.

The D2D communication system 400 may be present where devices (e.g., vehicles) operate in networks of different MNOs and/or different frequency spectrums. For example, each of the vehicles in a D2D (e.g., V2V or V2X) communication system may have a subscription from a respective corresponding MNO. The V2X spectrum may be shared with the frequency spectrums of the MNOs. In some examples, the D2D (e.g., V2V or V2X) communication system 400 may be deployed where the first vehicle 450' operates in the network operated by a first MNO, and the second vehicle 451' is not in a network—e.g., the V2X spectrum may have no network deployed.

The first vehicle 450' may be in D2D (e.g., V2V or V2X) communication with the second vehicle 451'. The first vehicle 450' incorporates a first UE 450, and the second vehicle 451' incorporates a second UE 451. The first UE 450 may operate on a first network 410 (e.g., of the first MNO). In aspects, the D2D communication system 400 may further include a third vehicle 452' that incorporates a third UE 452. The third UE 452 may operate on the first network 410 (e.g., of the first MNO) or another network, for example. The third vehicle 452' may be in D2D (e.g., V2V or V2X) communication with the first vehicle 450' and/or second vehicle 451'.

The first network 410 operates in a first frequency spectrum and includes the first base station 420 communicating at least with the first UE 450, for example, as described in FIGS. 1-3. The first base station 420 may communicate with the first UE 450 via a DL carrier 430 and/or an UL carrier 440. The DL communication may be performed via the DL carrier 430 using various DL resources (e.g., the DL subframes (FIG. 2A) and/or the DL channels (FIG. 2B)). The UL communication may be performed via the UL carrier 440 using various UL resources (e.g., the UL subframes (FIG. 2C) and the UL channels (FIG. 2D)).

In some aspects, the second UE 451 may not be on a network. In some aspects, the second UE 451 may be on a second network 411 (e.g., of the second MNO). The second network 411 may operate in a second frequency spectrum (e.g., a second frequency spectrum different from the first frequency spectrum) and may include the second base station 421 communicating with the second UE 451, for example, as described in FIGS. 1-3.

The second base station 421 may communicate with the second UE 451 via a DL carrier 431 and an UL carrier 441. The DL communication is performed via the DL carrier 431 using various DL resources (e.g., the DL subframes (FIG. 2A) and/or the DL channels (FIG. 2B)). The UL communication is performed via the UL carrier 441 using various UL resources (e.g., the UL subframes (FIG. 2C) and/or the UL channels (FIG. 2D)).

The D2D (e.g., V2V or V2X) communication may be carried out via one or more sidelink carriers 470, 480. The one or more sidelink carriers 470, 480 may include one or more channels, such as a physical sidelink broadcast channel (PSBCH), a physical sidelink discovery channel (PSDCH), a physical sidelink shared channel (PSSCH), and a physical sidelink control channel (PSCCH), for example.

In some examples, the sidelink carriers 470, 480 may operate using the PC5 interface. The first UE 450 (e.g., incorporated in the first vehicle 450') may transmit to one or more (e.g., multiple) devices, including to the second UE 451 (e.g., incorporated in the second vehicle 451') via the first sidelink carrier 470. The second UE 451 may transmit to one or more (e.g., multiple) devices, including to the first UE 450 (e.g., incorporated in the vehicle 450') via the second sidelink carrier 480.

In some aspects, the UL carrier 440 and the first sidelink carrier 470 may be aggregated to increase bandwidth. In some aspects, the first sidelink carrier 470 and/or the second sidelink carrier 480 may share the first frequency spectrum (with the first network 410) and/or share the second frequency spectrum (with the second network 411). In some aspects, the sidelink carriers 470, 480 may operate in an unlicensed spectrum.

The exemplary methods and apparatuses discussed infra are applicable to any of a variety of wireless D2D (e.g., V2V or V2X) communication systems. To simplify the discussion, the exemplary methods and apparatus may be discussed within the context of LTE. However, one of ordinary skill in the art would understand that the exemplary methods and apparatuses are applicable more generally to a variety of other wireless D2D (e.g., V2V or V2X) communication systems, including 5G.

In aspects, a sidelink communication on a sidelink carrier may occur between the first UE 450 (e.g., incorporated in the first vehicle 450') and the second UE 451 (e.g., incorporated in the second vehicle 451'). In an aspect, the first UE 450 (e.g., incorporated in the first vehicle 450') may perform a sidelink communication with one or more (e.g., multiple) devices, including to the second UE 451 (e.g., incorporated in the second vehicle 451') via the first sidelink carrier 470. For example, the first UE 450 may transmit a broadcast transmission via the first sidelink carrier 470 to the multiple devices (e.g., the second and third UEs 451, 452). The second UE 451 (e.g., among other UEs) may receive such broadcast transmission. Additionally or alternatively, the first UE 450 may transmit a multicast transmission via the first sidelink carrier 470 to the multiple devices. The second UE 451 (e.g., among other UEs) may receive such multicast transmission. Further, additionally or alternatively, the first UE 450 may transmit a unicast transmission via the first sidelink carrier 470 to a device, such as the second UE 451. The second UE 451 (e.g., among other UEs) may receive such unicast transmission. Additionally or alternatively, in an aspect, the second UE 451 (e.g., incorporated in the second vehicle 451') may perform a sidelink communication with one or more (e.g., multiple) devices, including the first UE 450 (e.g., incorporated in the first vehicle 450') via the second sidelink carrier 480. For example, the second UE 451 may transmit a broadcast transmission via the second sidelink carrier 480 to the multiple devices. The first UE 450 (e.g., among other UEs) may receive such broadcast transmission. Additionally or alternatively, the second UE 451 may transmit a multicast transmission via the second sidelink carrier 480 to the multiple devices (e.g., the first and third UEs 450, 452). The first UE 450 (e.g., among other UEs) may receive such multicast transmission. Further, additionally or alternatively, the second UE 451 may transmit a unicast transmission via the second sidelink carrier 480 to a device, such as the first UE 450. The first UE 450 (e.g., among other UEs) may receive such unicast transmission. The third UE 452 may communicate in a similar manner.

In aspects, for example, such a sidelink communication on a sidelink carrier between the first UE 450 and the second UE 451 may occur without having MNOs allocating resources (e.g., one or more portions of a resource block (RB), slot, frequency band and/or channel associated with a sidelink carrier 470, 480) for such communication and/or without scheduling such communication. In aspects, a sidelink communication may include a traffic communication (e.g., a data communication, control communication, a paging communication and/or a system information communication). Further, in aspects, a sidelink communication may include a sidelink feedback communication associated with a traffic communication (e.g., a transmission of feedback information for a previously-received traffic communication). In aspects, a sidelink communication may employ at least one sidelink communication structure having at least one feedback symbol. The feedback symbol of the sidelink communication structure may allot for any sidelink feedback information that may be communicated in the device-to-device (D2D) communication system 400 between devices (e.g., a first vehicle 450' and a second vehicle 451').

In aspects, a sidelink traffic communication and/or a sidelink feedback communication may be associated with one or more transmission time intervals (TTIs). In aspects, a TTI may be 0.5 ms, although a larger or smaller value may be employed. In aspects, a TTI may be associated with and/or correspond to a communication structure slot. However, a TTI may be associated with a larger or smaller and/or different communication structure dimension and/or time unit (e.g., one or more slots, subframes, or frames). In aspects of the present methods and apparatus, a sidelink communication (e.g., sidelink traffic communication and/or a sidelink feedback communication) in the D2D communication system 400 may include at least one sidelink communication structure having a sidelink feedback symbol (e.g., to allot for communication of feedback information). For example, during a first TTI, a device in the D2D communication system 400 (e.g., the first vehicle 450') transmitting a sidelink traffic communication using the sidelink communication structure having a sidelink feedback symbol may refrain from transmitting traffic information in one or more portions of the sidelink feedback symbol. In aspects, the sidelink traffic communication may be transmitted by the first vehicle 450' to one or more of any remaining devices (e.g., to the second vehicle 451') in the D2D communication system 400. Furthermore, during the first TTI another device in the D2D communication system 400 (e.g., the second vehicle 451') that is transmitting a sidelink feedback communication using the wireless communication structure having a sidelink feedback symbol may transmit feedback information in one or more portions of the sidelink feedback symbol. In this manner, sidelink communication (e.g., including a sidelink traffic communication and a sidelink feedback communication) may occur efficiently, without having MNOs allocate resources for such communication, and/or without having MNOs schedule such communication.

Figure 5:
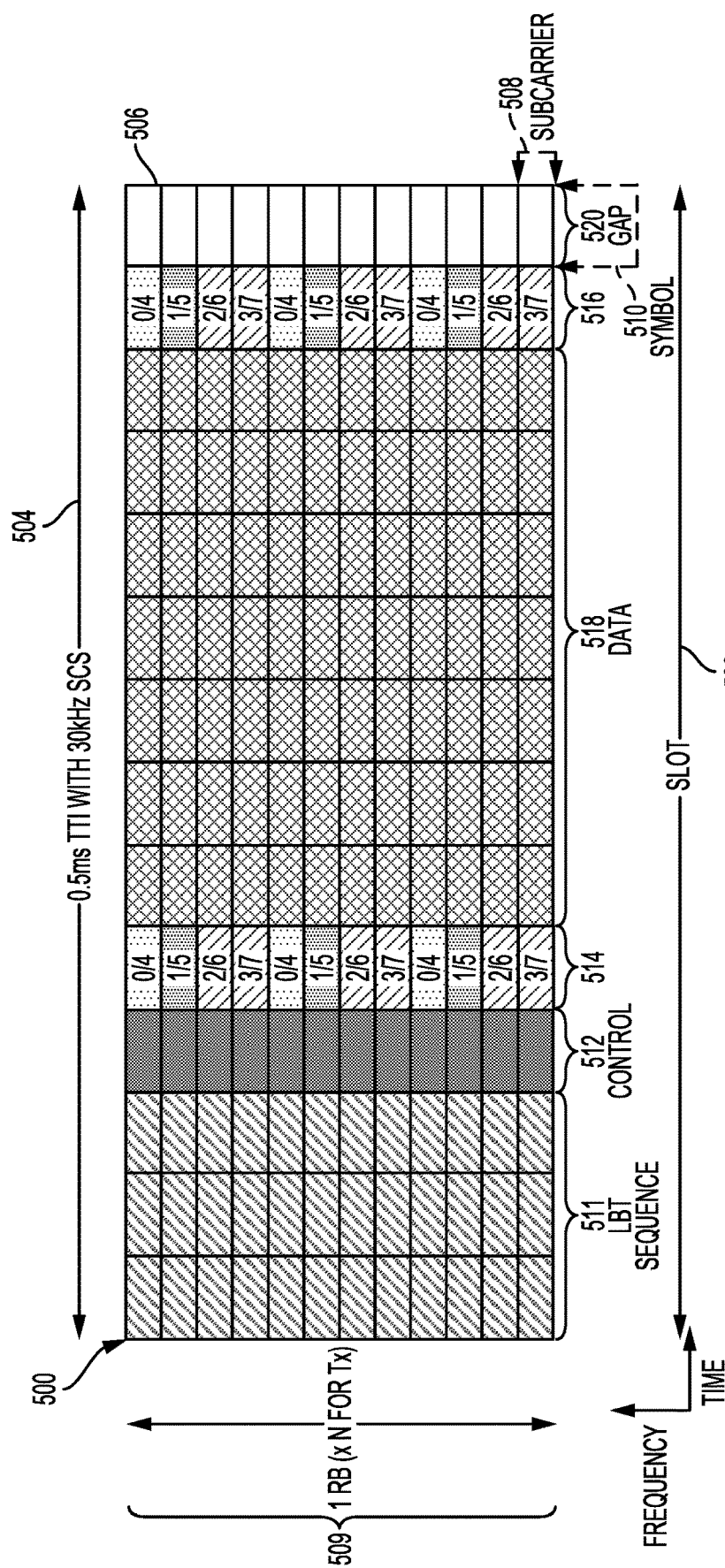
FIG. 5 is a diagram illustrating an example sidelink communication structure in accordance with various aspects of the present disclosure.

FIG. 5 is a diagram illustrating an example sidelink communication structure 500 in accordance with various aspects of the present disclosure. The sidelink communication structure 500 may be defined by resources in a frequency domain and time domain. For example, the sidelink communication structure 500 may represent a time slot 502 and/or correspond to a TTI 504 (e.g., 0.5 ms). A resource grid may be used to represent the time slot 502 including one or more time concurrent resource blocks (RBs) (also referred to as physical RBs (PRBs)). The resource grid is divided into multiple resource elements (REs). In aspects, a RB 506 includes 12 consecutive subcarriers (e.g., having 30 kHz subcarrier spacing) 508 in the frequency domain and 14 consecutive symbols 510 in the time domain, for a total of 168 REs. In aspects, a RB contains 12 consecutive subcarriers in the frequency domain and 12 consecutive symbols in the time domain, for a total of 144 REs. In aspects, a device (e.g., the first vehicle 450') may employ a plurality of resources blocks (e.g., N RBs) for a sidelink communication (e.g., a sidelink transmission) 509 in the D2D communication system 400. The sidelink communication 509 may correspond to a single TTI.

In aspects, one or more symbols 510 (e.g., one or more of the first three symbols 511) of the wireless communication structure 500 may be employed to communicate a listen-before-talk (LBT) sequence in a sidelink communication. Transmission of the sidelink communication by a device may be based on the LBT sequence. In aspects, one or more symbols (e.g., the fourth symbol 512) of the wireless communication structure 500 may be employed to communicate control information in a sidelink communication. In aspects, one or more symbols 510 (e.g., the fifth 514 and thirteenth symbols 516) of the wireless communication structure 500 may be employed to communicate reference signals (e.g., demodulation reference signals (DM-RSs) associated with ports 0-7) in a sidelink communication as shown. In aspects, one or more symbols 510 (e.g., the sixth through twelfth symbols 518) of the wireless communication structure 500 may be employed to communicate data in a sidelink communication. In aspects, one or more symbols 510 (e.g., the fourteenth symbol 520) of the wireless communication structure 500 may be configured as a guard period to accommodate uplink-downlink switching (e.g., turnaround) time.

In aspects, for example, the sidelink communication structure 500 may be employed for a broadcast sidelink communication. For example, the sidelink communication structure 500 may be employed for a broadcast sidelink transmission from a device (e.g., the first vehicle 450') in the D2D communication system 400 to a plurality of other devices (e.g., including the second vehicle 451') device in the D2D communication system 400. The sidelink communication structure 500 described above is exemplary and may be defined differently in the time and/or frequency domain. Additionally or alternatively, the sidelink communication structure 500 may be differently associated with a TTI (e.g., correspond to one or more portions of a TTI).

Figure 6:
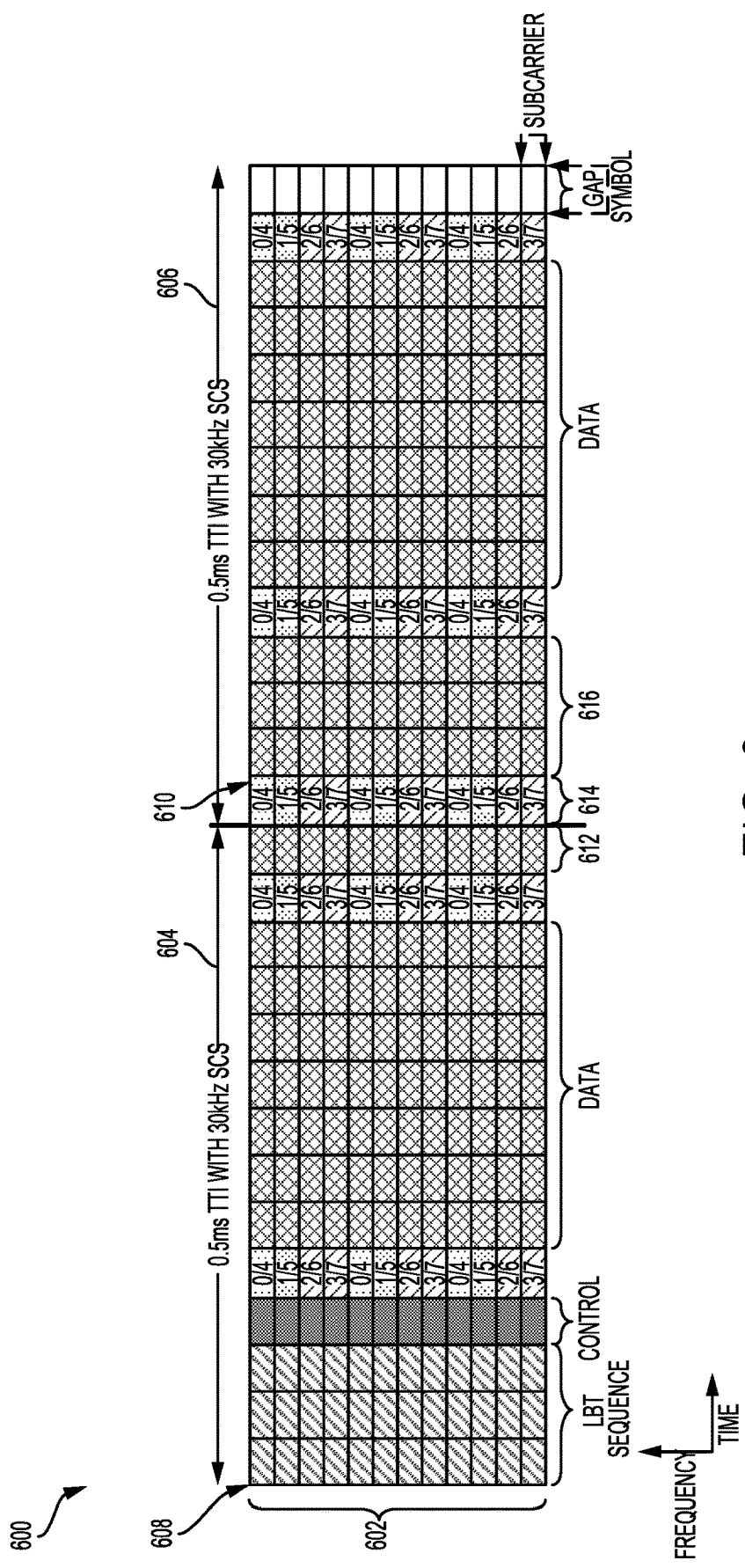
FIG. 6 is a diagram illustrating example sidelink communication structures in accordance with various aspects of the present disclosure.

FIG. 6 is a diagram illustrating example sidelink communication structures 600 in accordance with various aspects of the present disclosure. In aspects, a sidelink communication 602 may be associated with and/or correspond to a plurality of TTIs. For example, in aspects, the sidelink communication 602 may employ TTI-bundling in which a data portion of a sidelink communication may span a plurality of TTIs (e.g., a first TTI 604 and a second TTI 606). In aspects, the sidelink communication 602 may employ a plurality of sidelink communication structures (e.g., a first and second sidelink communication structures 608, 610). The first and second sidelink communication structures 608, 610 may be similar to the sidelink communication structure 500. However, the first and/or second sidelink communication structures 608, 610 may be adapted for TTI-bundling. In aspects, one or more portions of overhead (e.g., a LBT portion, control portion and/or guard period portion) associated with a sidelink communication structure may not be employed for every sidelink communication structure associated with a sidelink communication employing TTI-bundling. For example, rather than being employed as a guard period for uplink-downlink switching time, the last symbol 612 of the first sidelink communication structure 608 may be employed for data. Similarly, rather than being employed for LBT sequence(s) and/or control information, the first four symbols of the second sidelink communication structure 610 may be employed for reference signals and/or data. For example, a first symbol 614 of the second sidelink communication structure 610 may be employed for reference signals (e.g., DM-RS signals) and the next three symbols 616 may be employed for data.

However, the sidelink communication structure 500 and sidelink communication structures 600 shown in FIGS. 5 and 6 may not allot for feedback communication. Thus, a device in the D2D communication system 400 (e.g., the first vehicle 450') using (e.g., solely) such structures 500, 600 may be unable to communicate feedback information without adversely affecting transmission and/or reception of other types of communication (e.g., traffic communication).

DEVICE-TO-DEVICE FEEDBACK

In aspects of the present methods and apparatus, a sidelink communication (e.g., sidelink traffic communication and/or a sidelink feedback communication) in the D2D communication system 400 may include at least one wireless communication structure having a sidelink feedback symbol (e.g., to allot for communication of sidelink feedback information). In this manner, sidelink communication (e.g., including a sidelink traffic communication and a sidelink feedback communication) may occur efficiently, without having MNOs allocate resources for such communication, and/or without having MNOs schedule such communication.

Figure 7:
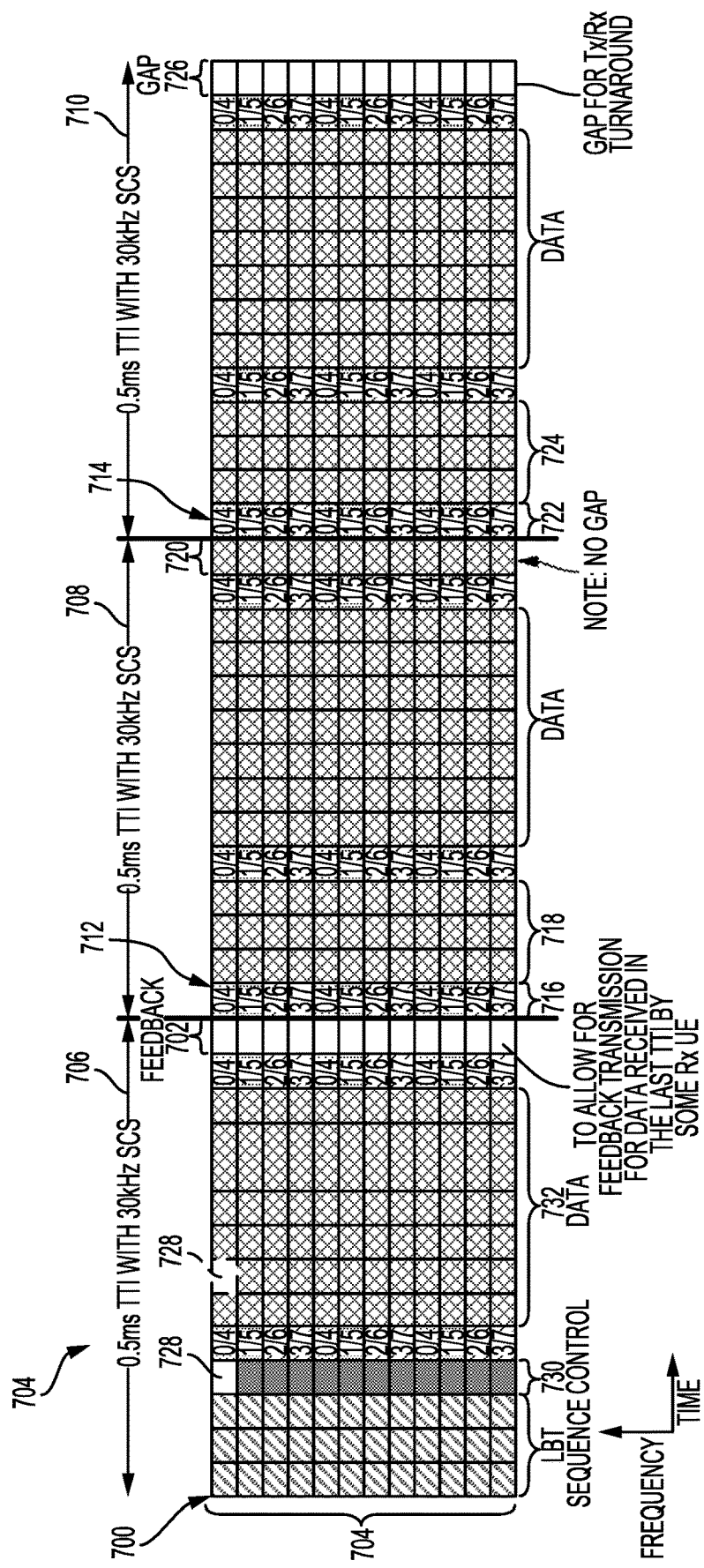
FIG. 7 is a diagram illustrating a sidelink communication structure having at least one feedback symbol in accordance with various aspects of the present disclosure.

FIG. 7 is a diagram illustrating a sidelink communication structure 700 having at least one feedback symbol 702 in accordance with various aspects of the present disclosure. For example, a sidelink communication 704 may be associated with and/or correspond to a plurality of TTIs. In aspects, the sidelink communication 704 may employ TTI-bundling, for example, in which a data portion of a sidelink communication may span a plurality of TTIs (e.g., a first TTI 706, second TTI 708 and third TTI 710). In aspects, the sidelink communication 704 may employ a plurality of sidelink communication structures (e.g., a first sidelink communication structure 700, a second sidelink communication structure 712, and a third sidelink communication structure 714). In aspects, the first sidelink communication structure 700 may serve as a first communication structure, the second sidelink communication structure 712 may serve as an intermediate communication structure, and a third sidelink communication structure 714 may serve as the last communication structure of the TTI-bundled sidelink communication. The first sidelink communication structure 700 may be similar to the sidelink communication structure 500. However, in contrast to the sidelink communication structure 500, the sidelink communication structure 700 includes at least one feedback symbol 702 (e.g., a sidelink feedback symbol). In aspects, the at least one feedback symbol 702 may be a last symbol of the wireless communication structure 700. However, in aspects, the at least one feedback symbol 702 may be a different symbol of the wireless communication structure 700. In aspects, the at least one feedback symbol 702 may be a plurality of symbols in the wireless communication structure 700. In aspects, intermediate and last communication structures, such as the second and third sidelink communication structures 712, 714, respectively, may be similar to the sidelink communication structure 500. However, the second and/or third sidelink communication structures 712, 714 may be adapted for TTI-bundling. In aspects, one or more portions of overhead (e.g., a LBT portion, control portion and/or guard period portion) associated with a sidelink communication structure may not be employed for every sidelink communication structure associated with a sidelink communication employing TTI-bundling. For example, a first symbol 716 of the second sidelink communication structure 712 may be employed for reference signals (e.g., DM-RS signals) and the next three symbols 718 may be employed for data. Further, the last symbol 720 of the second sidelink communication structure 712 may be employed for data. Similarly, a first symbol 722 of the third sidelink communication structure 714 may be employed for reference signals (e.g., DM-RS signals) and the next three symbols 724 may be employed for data. The last symbol 726 of the third sidelink communication structure 714 may be may be as a guard period to accommodate uplink-downlink switching time.

By employing a sidelink communication structure having at least one feedback symbol, such as sidelink communication structure 700 for a sidelink communication by a device, a TTI structure is modified to facilitate a sidelink communication (e.g., a unicast, multicast, and/or broadcast sidelink transmission by the device) with feedback (e.g., with an allotting for feedback to be transmitted by another device during the TTI and/or with an allotting for a device receiving the transmission to transmit feedback using the feedback symbol in a subsequent TTI using the TTI structure). Thus, in aspects, the present methods and apparatus facilitate feedback for a received transmission in a non-self-contained manner. To wit, feedback regarding data is sent by a receiving device m-TTIs after the device receives the data, where m is an integer (e.g., 1, 2, 3, etc.).

Although the sidelink communication structure 700 having at least one feedback symbol 702 is described above in the context of TTI-bundling, the present methods and apparatus include any sidelink communication structure having at least one feedback symbol 702. For example, the present methods and apparatus include a wireless communication structure similar to one or more of wireless communication structures 500, 608, 610, 712, 714 adapted to include the at least one feedback symbol 702 in lieu of one or more portion of existing symbol(s) described above.

The sidelink communication structure having at least one feedback symbol of the present methods and apparatus may be employed for device-to-device communication. In aspects, a device, such as for example, the first UE 450, transmitting a sidelink communication (e.g., a sidelink traffic communication) may employ rate matching and/or puncturing techniques to create the at least one feedback symbol 702. If the first UE 450 transmits a sidelink communication for N TTIs, a symbol (e.g., an identified symbol, such as a last symbol) of each of a subset of sidelink communication structures included in or corresponding to the N TTIs may be the at least one feedback symbol 702, where N is an integer (e.g., 1, 2, 3, etc.). For example, the identified symbol (e.g., last symbol) associated with a first subset of TTI(s), A, of the set of TTIs, {1, ..., N} of a N-TTI transmission are used as a feedback symbol(s). In aspects, the first subset of A may include {1}, {1, N}, {1, ..., N}, for example. However, a different subset may be employed. In aspects, the sidelink communication transmitted by the first UE 450 may include an indication 728 to one or more devices that receive the sidelink communication, such as for example, the second UE 451, of a subset B of the first subset A described above. The subset B may be used to determine a TTI and/or sidelink communication structure, associated with subset B, in which to send feedback. In aspects, for example, the indication 728 may be indicated by or included in a control portion 730 or may be included in a data portion 732 (e.g., in a medium access control (MAC) control element (CE) in the sidelink communication transmitted by the first UE 450. In this manner, one or more devices, such as the second UE 451 may determine when to transmit feedback information (e.g., associated with the received sidelink communication or another communication) in a subsequent TTI based on the received sidelink communication. In aspects, the first subset may be based on an RRC configuration or pre-configuration (e.g., a provisioned RRC configuration for the second UE 451).

In aspects, a device, such as a UE 450 or 451, may communicate a sidelink traffic communication by transmitting the sidelink traffic communication to one or more UEs. Such device may communicate a sidelink feedback communication in one or more portions of at least one feedback symbol by receiving the sidelink feedback communication. Additionally or alternatively, in aspects, a device, such as a UE 450 or 451, may communicate a sidelink traffic communication by receiving the sidelink traffic communication from one or more UEs. Such device may communicate a sidelink feedback communication in one or more portions of at least one feedback symbol by transmitting the sidelink feedback communication.

In aspects, for traffic (e.g., data) of a sidelink traffic communication received (e.g., from the second UE 451) in $TTI_n$, the first UE 450 may transmit feedback information in the feedback symbol 702 associated with a subsequent TTI, $TTI_{n+m}$ occurring m TTIs after $TTI_n$, where n and m are integers. In aspects, m=1. To wit, the first UE 450 may transmit the feedback information in the TTI succeeding (e.g., immediately succeeding) $TTI_n$n aspects, the value for m may be based on the subset B. In aspects, for example, the first UE 450 may determine or assume a similar pattern may be employed for sidelink communication in subsequent TTIs. Thus, the first UE 450 may determine a subsequent TTI in which to transmit the sidelink feedback communication based the subset B.

In aspects, frequency resources employed to transmit the sidelink feedback information in the feedback symbol 702 may be based on frequency resources employed for the sidelink traffic (e.g., data) communication. In aspects, for traffic of a sidelink traffic communication received by the first UE 450 (e.g., from the second UE 451) using a set of frequency resources (e.g., 120 subcarriers), the first UE 450 may transmit sidelink feedback information in the feedback symbol 702 using the set of frequency resources (e.g., all the frequency resources as used for the data transmission). In aspects, for traffic of a sidelink traffic communication received by the first UE 450 (e.g., from the second UE 451) using a set of frequency resources (e.g., 120 subcarriers), the first UE 450 may transmit sidelink feedback information in the feedback symbol 702 using a subset of the set of frequency resources. For example, in aspects, the first UE 450 may employ a subset of the set of frequency resources for the sidelink traffic transmission by employing at least the first subchannel of a plurality of subchannels used for the traffic transmission for the sidelink feedback transmission. In aspects, a subchannel and/or the plurality of subchannels may be, for example a frequency range based on a number of resource blocks used for the sidelink traffic communication. In aspects, the first UE 450 may employ a subset of the set of frequency resources for the sidelink traffic transmission by employing at least a first subchannel used for traffic (e.g., data) transmission. In aspects, the first UE 450 may employ a subset of the set of frequency resources for the sidelink traffic transmission by employing a subchannel for the sidelink feedback transmission based on measuring, by the first UE 450, of at least one of signal strength, power, or quality associated with communicating the sidelink traffic communication on the frequency resources of the sidelink traffic communication. For example, the subset may be based on or include at least a lowest energy subchannel based on past sensing on sidelink traffic communication resources.

In aspects, the first UE 450 may employ a first subcarrier spacing (e.g., 15 kHz) for a data traffic communication. To facilitate automatic gain control (AGC), the first UE 450 may transmit feedback information in the feedback symbol 702 using a subcarrier spacing associated with the sidelink feedback communication that is the subcarrier spacing associated with the sidelink traffic communication increased by a factor (e.g., twice the subcarrier spacing used for data transmissions). For example, a subcarrier spacing associated with the sidelink feedback communication may be an integer multiple of a subcarrier spacing associated with a data traffic communication. Such sidelink feedback communication may include repetitive communication of sidelink feedback information in one or more portions of at least two feedback symbols respectively (e.g., identical feedback symbol repeated two or more times) of the sidelink communication structure having at least one feedback symbol. In this manner, the second UE 451 may reduce and/or avoid the adverse effects associated with improper AGC (e.g., saturation and/or clipping) while receiving the sidelink feedback communication. For example, the second UE 451 may perform AGC based on the first of such two feedback symbols such that the second of such two feedback symbols may be successfully processed to determine feedback information.

In aspects, for a sidelink traffic communication received by the first UE 450 (e.g., from the second UE 451), the first UE 450 may scramble the feedback information bits before transmitting the feedback information in the feedback symbol 702. In aspects, the first UE 450 may employ an identifier (ID) associated with the first UE 450 to scramble the feedback information bits. In aspects, the ID may be assigned or configured. In this manner, if the sidelink traffic communication transmit by the second UE 451 is a multicast or broadcast transmission, the second UE 451 may determine the source (e.g., based on the ID) of a received sidelink feedback communication for the previously-transmitted sidelink traffic communication.

In aspects, for a sidelink traffic communication received by the first UE 450 (e.g., from the second UE 451), the first UE 450 may determine a power for a sidelink feedback communication (e.g., a sidelink feedback transmission) with the second UE 451 using a predetermined value or based on a measurement performed by the first UE 450 of one or more reference signals. For example, the first UE 450 may determine a transmit power for the sidelink feedback information based on a received data power (e.g., function of RSRP measurements performed on DMRSs) or based on fixing the transmit power for the feedback information to a value (e.g., a maximum value). The first UE 450 may use such determined power for a sidelink feedback communication.

In aspects, for a received sidelink traffic communication (e.g., from the second UE 451), the first UE 450 may transmit feedback information communication to the second UE 451 including at least one of positive/negative acknowledgement (ACK/NACK) information, channel quality indicator (CQI) information, rank indicator (RI) information, precoding matrix indicator (PMI) information, buffer status information (e.g., buffer status report), or timing information of a subsequent transmission by a source (e.g., the first UE 450) of the feedback information. In aspects, such sidelink feedback information (e.g., the timing information of a subsequent sidelink transmission) may facilitate sidelink communication coordination among devices (e.g., the first UE 450, the second UE 451 and the third UE 452) in the D2D communication system 400 since, in aspects, D2D communication (e.g., sidelink communication) between or among vehicles 450', 451', 452' is not scheduled by MNOs.

Figure 8:
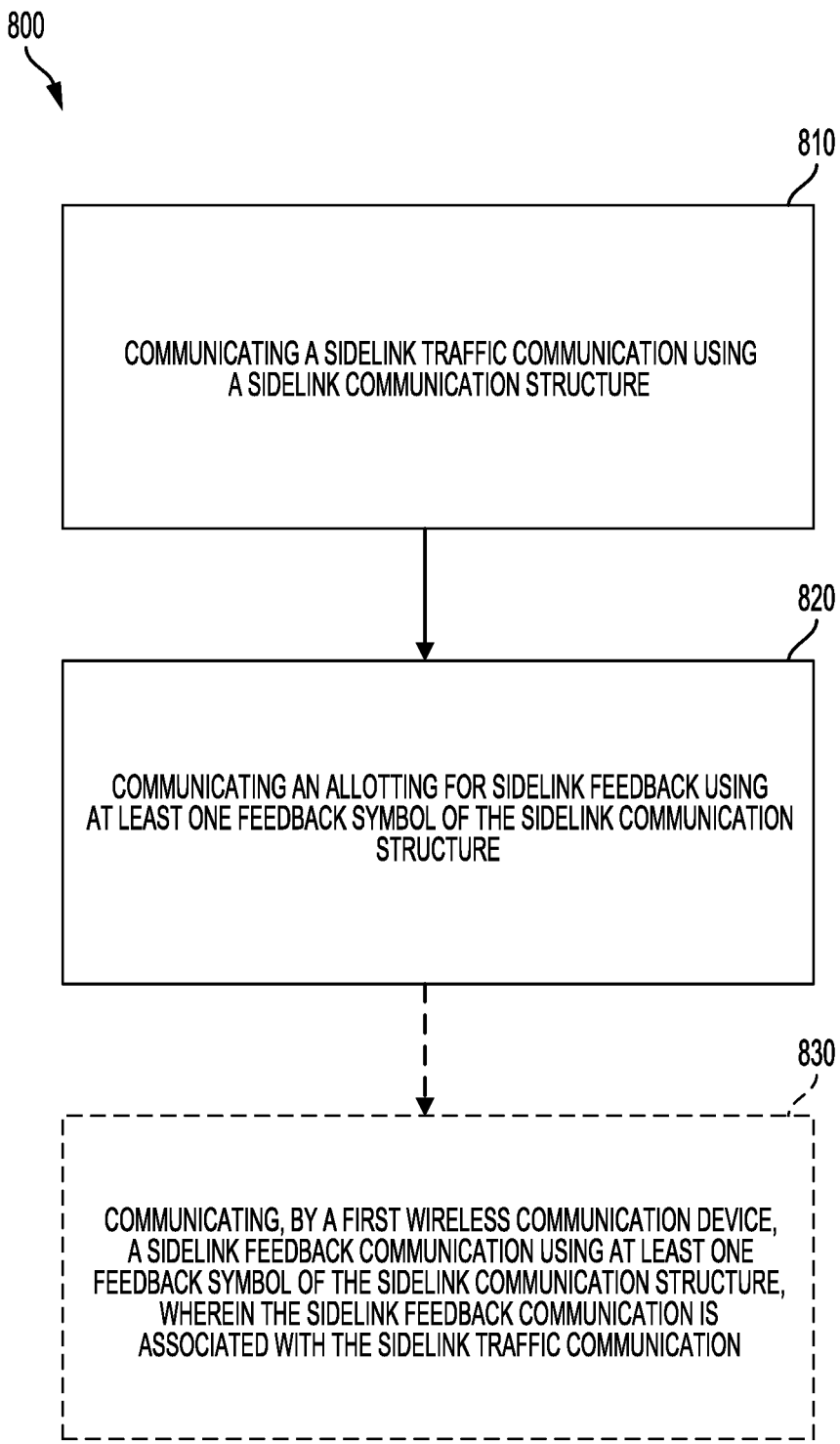
FIG. 8 is a flow diagram of a method for wireless communication in accordance with various aspects of the present disclosure.

FIG. 8 is a flow diagram of a method for wireless communication in accordance with various aspects of the present disclosure. Steps of the method 800 can be executed by a computing device (e.g., a processor, processing circuit, and/or other suitable component) of a wireless communication device, such as the UEs 104, 104', 350, 450 and 451. As illustrated, the method 800 of wireless communication includes a number of enumerated steps, but embodiments of the method 800 may include additional steps before, after, and in between the enumerated steps. In some embodiments, one or more of the enumerated steps may be omitted or performed in a different order.

At step 810, the method 800 includes communicating a sidelink traffic communication using a sidelink communication structure. At step 820, the method 800 includes communicating an allotting for sidelink feedback using at least one feedback symbol of the sidelink communication structure. In some aspects, at step 830, the method 800 includes communicating, by a first wireless communication device, a sidelink feedback communication using at least one feedback symbol of the sidelink communication structure, wherein the sidelink feedback communication is associated with the sidelink traffic communication. In aspects, sidelink feedback may be included in one or more portions of the at least one feedback symbol. In this manner, for example, the present methods and apparatus may facilitate feedback transmission for NR sidelink communication. In aspects, the feedback is transmitted by a device in a non-self-contained manner (e.g., not within the same TTI in which data is received by such device). In aspects, the present methods and apparatus may be employed in a NR V2X context or system.

In aspects, the sidelink traffic communication uses at least one of the sidelink communication structures. In aspects, communicating a sidelink traffic communication includes communicating a sidelink traffic communication in a first set of one or more transmission time intervals (TTIs), and a subset of the first set of one or more TTIs corresponds respectively to one or more sidelink communication structures each having at least one feedback symbol. In such aspects, the subset of the first set of TTIs is based on a radio resource control configuration or pre-configuration. In such aspects, the sidelink traffic communication indicates a subset of the subset. Further, in such aspects, communicating, by the first wireless communication device, the sidelink feedback communication includes communicating, by the first wireless communication device, a sidelink feedback communication using one or more portions of a feedback symbol of the sidelink communication structure in a TTI subsequent to the first set of TTIs based on the subset of the subset. In such further aspects, the sidelink traffic communication indicates the subset using a control portion or a media access control control element associated with a data portion of the sidelink traffic communication.

In aspects, communicating a sidelink traffic communication includes communicating a sidelink traffic communication in a first set of one or more TTIs, the sidelink traffic communication indicates at least one TTI in which the sidelink feedback communication may be communicated, and communicating, by the first wireless communication device, the sidelink feedback communication includes communicating, by the first wireless communication device, a sidelink feedback communication in the indicated at least one TTI. In aspects, communicating, by the first wireless communication device, the sidelink feedback communication includes communicating, by the first wireless communication device, the sidelink feedback communication in a TTI succeeding the first set of one or more TTIs.

In aspects, frequency resources used for communicating the sidelink feedback communication are based on frequency resources used for communicating the sidelink traffic communication. In such aspects, frequency resources used for communicating the sidelink feedback communication correspond to all the frequency resources used for communicating the sidelink traffic communication. In such aspects, frequency resources used for communicating the sidelink feedback communication are a subset of the frequency resources used for communicating the sidelink traffic communication. In such further aspects, the subset of the frequency resources includes a first portion of the frequency resources used for communicating the sidelink traffic communication. In such further aspects, the subset of the frequency resources is based on measuring, by the first wireless communication device, at least one of signal strength, power, or quality associated with communicating the sidelink traffic communication on the frequency resources.

In aspects, a subcarrier spacing associated with the sidelink feedback communication is an integer multiple of a subcarrier spacing associated with a sidelink data communication, and communicating the sidelink feedback communication includes repetitively communicating sidelink feedback information in one or more portions of at least two feedback symbols respectively of the sidelink communication structure having at least one feedback symbol. In aspects, communicating, by the first wireless communication device, the sidelink feedback communication includes transmitting the sidelink feedback communication by the first wireless communication device, and the first wireless communication device scrambles the sidelink feedback information of the communication based on an identifier associated with the first wireless communication device. In aspects, communicating, by the first wireless communication device, the sidelink feedback communication includes transmitting the sidelink feedback communication by the first wireless communication device using a power that is a predetermined value or is based on measurement performed by the first wireless communication device of one or more reference signals. In aspects, the sidelink feedback communication includes at least one of positive/negative acknowledgement information, channel quality indicator information, rank indicator information, precoding matrix indicator information, buffer status information, or timing information of a subsequent transmission by a source of the feedback information. In aspects, the traffic communication and feedback communication are device-to-device (D2D) communication. In such aspects, the traffic communication and feedback communication are vehicle-to-everything (V2X) communication.

In aspects, the sidelink traffic communication includes a unicast communication, a multicast communication or a broadcast communication. In aspects, the sidelink traffic communication is associated with a first transmission time interval (TTI), and the sidelink feedback communication is associated with a second TTI different from the first TTI. In aspects, the first wireless communication device is a user equipment, and communicating the sidelink feedback communication includes transmitting the sidelink feedback communication. In aspects, the first wireless communication device is a user equipment, and communicating the sidelink feedback communication includes receiving the sidelink feedback communication. In aspects, the sidelink communication may be a NR sidelink communication.

In aspects, communicating a sidelink traffic communication using a sidelink communication structure and communicating an allotting for sidelink feedback using at least one feedback symbol of the sidelink communication structure includes receiving a sidelink traffic communication using a sidelink communication structure includes and communicating an allotting for sidelink feedback using at least one feedback symbol of the sidelink communication structure by the UE 104, 104', 350, 450 and 451. In such aspects, receiving a sidelink feedback communication using at least one feedback symbol of the sidelink communication structure, wherein the sidelink feedback communication is associated with the sidelink traffic communication includes transmitting, by the UE 104, 104', 350, 450 and 451, a sidelink feedback communication using at least one feedback symbol of the sidelink communication structure, wherein the sidelink feedback communication is associated with the sidelink traffic communication.

In aspects, communicating a sidelink traffic communication using a sidelink communication structure and communicating an allotting for sidelink feedback using at least one feedback symbol of the sidelink communication structure includes transmitting a sidelink traffic communication using a sidelink communication structure and transmitting an allotting for sidelink feedback using at least one feedback symbol of the sidelink communication structure by the UE 104, 104', 350, 450 and 451. In such aspects, communicating a sidelink feedback communication using at least one feedback symbol of the sidelink communication structure, wherein the sidelink feedback communication is associated with the sidelink traffic communication includes receiving, by the UE 104, 104', 350, 450 and 451, a sidelink feedback communication using at least one feedback symbol of the sidelink communication structure, wherein the sidelink feedback communication is associated with the sidelink traffic communication.

Figure 9:
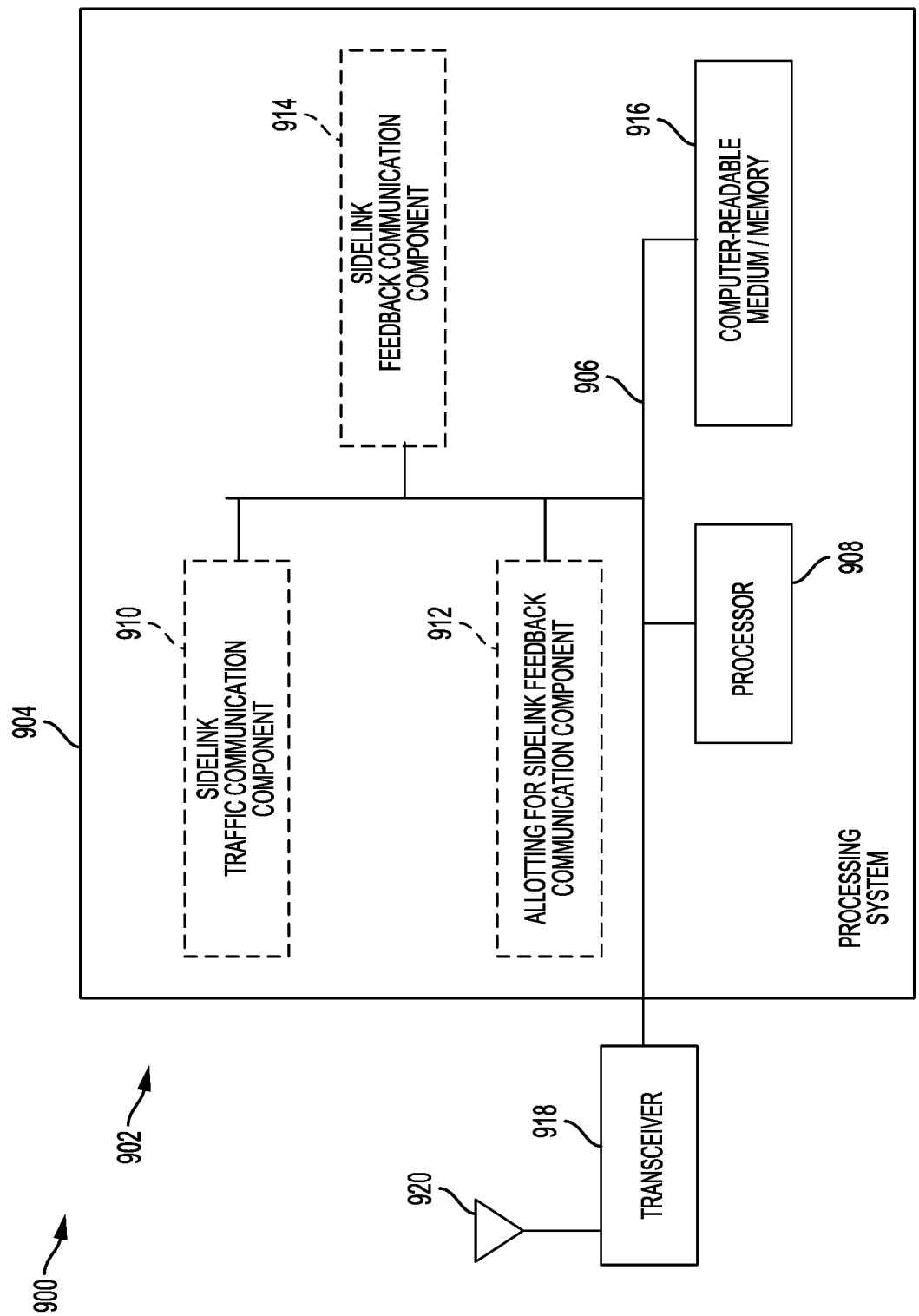
FIG. 9 is a diagram illustrating an example of a hardware implementation for an apparatus for wireless communication employing a processing system in accordance with various aspects of the present disclosure.

FIG. 9 is a diagram 900 illustrating an example of a hardware implementation for an apparatus 902 for wireless communication employing a processing system 904 in accordance with various aspects of the present disclosure. In aspects, the apparatus 902 for wireless communication may be a UE 104, 104', 350, 450, 451, 452, for example. The processing system 904 may be implemented with a bus architecture, represented generally by the bus 906. The bus 906 may include any number of interconnecting buses and bridges depending on the specific application of the processing system 904 and the overall design constraints. In aspects, the apparatus 902 may include a sidelink traffic communication component 910 that communicates (e.g., transmits and/or receives) a sidelink traffic communication using a sidelink communication structure. In an aspect, the sidelink traffic communication component 910 may be configured to communicate a sidelink traffic communication in a first set of one or more transmission time intervals (TTIs) or a subset of the first set TTIs corresponding respectively to one or more sidelink communication structures each having at least one feedback symbol. In an aspect, the sidelink traffic communication component 910 indicates the subset using a control portion or a media access control control element associated with a data portion of the sidelink traffic communication. In an aspect, the sidelink traffic communication component 910 may be configured to employ the first set of TTIs based on a radio resource control configuration or pre-configuration. In an aspect, the sidelink traffic communication component 910 may be configured to indicate a subset of the subset of the first set of TTIs in the sidelink traffic communication. In an aspect, the sidelink traffic communication component 910 may be configured to communicate a sidelink traffic communication in a first set of one or more TTIs, the sidelink traffic communication indicating at least one TTI in which a sidelink feedback communication may be communicated.

In aspects, the apparatus 902 may include an allotting for sidelink feedback communication component 912 that communicates (e.g., transmits and/or receives) an allotting for sidelink feedback using at least one feedback symbol of the sidelink communication structure. In an aspect, the allotting for sidelink feedback communication component 912 may be configured to communicate at least one feedback symbol which allots for communication of feedback information in the sidelink traffic communication (e.g., by employing processing techniques associated with rate matching and/or puncturing).

In aspects, the apparatus 902 may include a sidelink feedback communication component 914 that communicates (e.g., transmits and/or receives) a sidelink feedback communication using at least one feedback symbol of the sidelink communication structure, wherein the sidelink feedback communication is associated with the sidelink traffic communication. In aspects, the sidelink feedback communication component 914 may be configured to communicate a sidelink feedback communication in one or more portions of a feedback symbol of the sidelink communication structure in at least one TTI that is indicated in sidelink traffic communication. In aspects, the sidelink feedback communication component 914 may be configured to communicate the sidelink feedback communication using one or more portions of a feedback symbol of the sidelink communication structure in a TTI subsequent to the first set of TTIs based on a subset of the subset of the first set of TTIs indicated in sidelink traffic communication. In aspects, the sidelink feedback communication component 914 may be configured to communicate the sidelink feedback communication in one or more portions of a feedback symbol of the sidelink communication structure in a TTI at least one of subsequent or succeeding the first set of TTIs of a sidelink traffic communication. In aspects, the sidelink feedback communication component 914 may be configured to employ a subcarrier spacing associated with the sidelink feedback communication that is an integer multiple of a subcarrier spacing associated with a sidelink data communication, and configured to communicate the sidelink feedback communication includes repetitively communicating sidelink feedback information in one or more portions of at least two feedback symbols respectively of the sidelink communication structure having at least one feedback symbol.

In aspects, the sidelink feedback communication component 914 may be configured to transmit the sidelink feedback communication by the first wireless communication device and configured to scramble the sidelink feedback information of the communication based on an identifier associated with the first wireless communication device. In aspects, the sidelink feedback communication component 914 may be configured to transmit the sidelink feedback communication by the first wireless communication device using a power that is a predetermined value or is based on measurement performed by the first wireless communication device of one or more reference signals.

The bus 906 links together various circuits including one or more processors and/or hardware components, represented by the processor 908, the components 910, 912, 914, and the computer-readable medium/memory 916. The bus 906 may also link various other circuits such as timing sources, peripherals, voltage regulators, and power management circuits, which are well known in the art, and therefore, will not be described any further.

The processing system 904 may be coupled to a transceiver 918. The transceiver 918 is coupled to one or more antennas 920. The transceiver 918 provides a means for communicating with various other apparatus over a transmission medium. The transceiver 918 receives a signal from the one or more antennas 920, extracts information from the received signal, and provides the extracted information to the processing system 904, for example, to the sidelink traffic communication component 910, allotting for sidelink feedback communication component 912, and/or sidelink feedback communication component 914. In addition, the transceiver 918 receives information from the processing system 904, for example, from the sidelink traffic communication component 910, allotting for sidelink feedback communication component 912, and/or sidelink feedback communication component 914, and based on the received information, generates a signal to be applied to the one or more antennas 920. The processing system 904 includes a processor 908 coupled to a computer-readable medium/memory 916. The processor 904 is responsible for general processing, including the execution of software stored on the computer-readable medium/memory 916. The software, when executed by the processor 908, causes the processing system 904 to perform the various functions described supra for any particular apparatus. The computer-readable medium/memory 908 may also be used for storing data that is manipulated by the processor 908 when executing software. The components 910, 912, 914 may be software components running in the processor 908, resident/stored in the computer readable medium/memory 916, one or more hardware components coupled to the processor 908, or some combination thereof. The processing system 904 may be a component of the UE 350 and may include the memory 360 and/or at least one of the TX processor 368, the RX processor 356, and the controller/processor 359.

In one configuration, the apparatus 902 for wireless communication includes means for communicating a sidelink traffic communication using a sidelink communication structure. The apparatus 902 may further include means for communicating an allotting for sidelink feedback using at least one feedback symbol of the sidelink communication structure. The apparatus 902 may further include means for communicating a sidelink feedback communication using at least one feedback symbol of the sidelink communication structure, wherein the sidelink feedback communication is associated with the sidelink traffic communication.

The aforementioned means may be one or more of the aforementioned components of the apparatus 902 and/or the processing system 904 of the apparatus 902 configured to perform the functions recited by the aforementioned means. As described supra, the processing system 904 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
   communicating a sidelink traffic communication in a first set of one or more transmission time intervals (TTIs), wherein a subset of the first set of one or more TTIs corresponds to a sidelink communication structure having at least one feedback symbol; and communicating an allotting for sidelink feedback using the at least one feedback symbol of the sidelink communication structure.

2. The method of claim 1, further comprising:
communicating, by a first wireless communication device, a sidelink feedback communication using said at least one feedback symbol of the sidelink communication structure, wherein the sidelink feedback communication is associated with the sidelink traffic communication.

3. The method of claim 1, wherein the subset of the first set of TTIs is based on a radio resource control configuration or pre-configuration.

4. The method of claim 1, wherein:
the sidelink traffic communication indicates a subset of the subset.

5. The method of claim 4, further comprising communicating, by a first wireless communication device, a sidelink feedback communication using one or more portions of a feedback symbol of the sidelink communication structure in a TTI subsequent to the first set of TTIs based on the subset of the subset.

6. The method of claim 4, wherein the sidelink traffic communication indicates the subset using a control portion or a media access control element associated with a data portion of the sidelink traffic communication.

7. The method of claim 1, wherein the sidelink traffic communication indicates at least one TTI for communicating a sidelink feedback communication, and further comprising communicating, by a first wireless communication device, the sidelink feedback communication in one or more portions of a feedback symbol of the sidelink communication structure in the indicated at least one TTI.

8. The method of claim 1, further comprising communicating, by a first wireless communication device, a sidelink feedback communication in one or more portions of a feedback symbol of the sidelink communication structure in a TTI subsequent to the first set of TTIs or succeeding the first set of TTIs.

9. The method of claim 2, wherein frequency resources used for communicating the sidelink feedback communication are based on frequency resources used for communicating the sidelink traffic communication.

10. The method of claim 9, wherein frequency resources used for communicating the sidelink feedback communication correspond to all the frequency resources used for communicating the sidelink traffic communication.

11. The method of claim 9, wherein frequency resources used for communicating the sidelink feedback communication are a subset of the frequency resources used for communicating the sidelink traffic communication.

12. The method of claim 11, wherein the subset of the frequency resources includes a first portion of the frequency resources used for communicating the sidelink traffic communication.

13. The method of claim 11, wherein the subset of the frequency resources is based on measuring, by the first wireless communication device, at least one of signal strength, power, or quality associated with communicating the sidelink traffic communication on the frequency resources.

14. The method of claim 2, wherein:
a subcarrier spacing associated with the sidelink feedback communication is an integer multiple of a subcarrier spacing associated with the sidelink traffic communication; and
communicating the sidelink feedback communication includes repetitively communicating sidelink feedback information in one or more portions of at least two feedback symbols respectively of the sidelink communication structure having at least one feedback symbol.

15. The method of claim 2, wherein communicating, by the first wireless communication device, the sidelink feedback communication includes transmitting the sidelink feedback communication by the first wireless communication device, the method further comprising:
scrambling, by the first wireless communication device, information of the sidelink feedback communication based on an identifier associated with the first wireless communication device.

16. The method of claim 2, wherein:
communicating, by the first wireless communication device, the sidelink feedback communication includes transmitting the sidelink feedback communication by the first wireless communication device using a power that is a predetermined value or is based on a measurement performed by the first wireless communication device of one or more reference signals.

17. The method of claim 2, wherein the sidelink feedback communication includes at least one of positive/negative acknowledgement information, channel quality indicator information, rank indicator information, precoding matrix indicator information, buffer status information, or timing information of a subsequent transmission by a source of feedback information.

18. The method of claim 2, wherein the sidelink traffic communication and the sidelink feedback communication are device-to-device (D2D) communication.

19. The method of claim 18, wherein the sidelink traffic communication and the sidelink feedback communication are vehicle-to-everything (V2X) communication.

20. The method of claim 1, wherein the sidelink traffic communication includes a unicast communication, a multicast communication or a broadcast communication.

21. The method of claim 2, wherein:
the sidelink traffic communication is associated with a first transmission time interval (TTI); and
the sidelink feedback communication is associated with a second TTI different from the first TTI.

22. The method of claim 2, wherein:
the first wireless communication device is a user equipment; and
communicating the sidelink feedback communication includes transmitting the sidelink feedback communication.

23. The method of claim 2, wherein:
the first wireless communication device is a user equipment; and
communicating the sidelink feedback communication includes receiving the sidelink feedback communication.

24. A wireless communication device for wireless communication, comprising:
a memory; and
at least one processor coupled to the memory, the at least one processor configured to:
communicate a sidelink traffic communication in a first set of one or more transmission time intervals (TTIs), wherein a subset of the first set of one or more TTIs corresponds to a sidelink communication structure having at least one feedback symbol; and communicate an allotting for sidelink feedback using at least one feedback symbol of the sidelink communication structure.

25. The wireless communication device of claim 24, wherein the at least one processor is further configured to communicate, by a first wireless communication device, a sidelink feedback communication using said at least one feedback symbol of the sidelink communication structure, wherein the sidelink feedback communication is associated with the sidelink traffic communication.

26. The wireless communication device of claim 24, wherein the wireless communication device is a user equipment configured for device-to-device communication.

27. A non-transitory computer-readable medium storing one or more instructions for wireless communication by a wireless communication device,
    the one or more instructions, when executed by one or more processors of a user equipment, causing the one or more processors to:
        communicate a sidelink traffic communication in a first set of one or more transmission time intervals (TTIs), wherein a subset of the first set of one or more TTIs corresponds to a sidelink communication structure having at least one feedback symbol; and
        communicate an allotting for sidelink feedback using at least one feedback symbol of the sidelink communication structure.

28. An apparatus for wireless communication, comprising:
    means for communicating a sidelink traffic communication in a first set of one or more transmission time intervals (TTIs), wherein a subset of the first set of one or more TTIs corresponds to a sidelink communication structure having at least one feedback symbol; and
    means for communicating an allotting for sidelink feedback using at least one feedback symbol of the sidelink communication structure.

29. The apparatus of claim 28, further comprising
    means for communicating, by a first wireless communication device, a sidelink feedback communication using said at least one feedback symbol of the sidelink communication structure, wherein the sidelink feedback communication is associated with the sidelink traffic communication.

* * * * *